(12) United States Patent
Solstin

(10) Patent No.: US 11,008,112 B2
(45) Date of Patent: May 18, 2021

(54) LAMINAR INDUCING APPARATUS

(71) Applicant: Bryan B Solstin, Mill Creek, WA (US)

(72) Inventor: Bryan B Solstin, Mill Creek, WA (US)

(73) Assignee: Bryan B. Solstin, Mill Creek, WA (US)

( * ) Notice: Subject to any disclaimer, the term of this patent is extended or adjusted under 35 U.S.C. 154(b) by 50 days.

(21) Appl. No.: 16/435,294

(22) Filed: Jun. 7, 2019

(65) Prior Publication Data
US 2020/0385136 A1 Dec. 10, 2020

(51) Int. Cl.
*B64D 33/02* (2006.01)
*B64D 41/00* (2006.01)
*F02C 7/04* (2006.01)

(52) U.S. Cl.
CPC ............ *B64D 33/02* (2013.01); *B64D 41/00* (2013.01); *F02C 7/04* (2013.01); *B64C 2230/04* (2013.01); *B64D 2033/0213* (2013.01); *B64D 2033/0286* (2013.01); *B64D 2041/002* (2013.01); *F05D 2220/50* (2013.01); *F05D 2260/96* (2013.01); *F05D 2300/30* (2013.01)

(58) Field of Classification Search
CPC ....... F02C 7/04; B64C 2230/04; B64D 33/02; B64D 41/00; B64D 2033/0213; B64D 2033/0286; B64D 2041/002; F05D 2220/50; F05D 2260/96; F05D 2300/30
See application file for complete search history.

(56) References Cited

U.S. PATENT DOCUMENTS

| | | | | |
|---|---|---|---|---|
| 3,819,009 | A * | 6/1974 | Motsinger | F02C 7/045 181/292 |
| 9,840,334 | B2 * | 12/2017 | Lucas | B64D 41/00 |
| 2005/0045774 | A1 | 3/2005 | Hocking | |
| 2008/0023590 | A1 | 1/2008 | Merrill | |
| 2009/0025393 | A1 * | 1/2009 | Sheldon | F02C 7/32 60/725 |
| 2009/0074564 | A1 * | 3/2009 | Napier | F02C 7/045 415/119 |

(Continued)

OTHER PUBLICATIONS

P. 6, L. Leylekian, M. Leburn, P. Lempereur. An overview of aircraft noise reduction technologies. . . AerospaceLab, 2014, p. 1-15. 10.12762/2014.AL07-01. hal-01184664.

*Primary Examiner* — Igor Kershteyn
(74) *Attorney, Agent, or Firm* — Bryan B. Solstin

(57) ABSTRACT

A Laminar Inducing Apparatus (LIA) inducing laminar airflow to a turbine engine or a propulsion fan. The LIA produces turbulent-free airflow with a light aerospace structure that can replace single purpose structure in the wing or empennage. Laminar airflow to the propulsion fan or the turbine engine is ensured in a greater number of flight conditions and angles of attack. Active control of flight can be enhanced by the manipulating the turbulent boundary surface as a flight control surface. LIA simply reduces the risk of FOD or bird strike damage. In addition to the engineered, laminar benefits, LIA provides greater safety from ground ingested FOD and more silent vertical take-off and landing. In summary, LIA ensures laminar airflow and acoustic attenuation to a propulsion fan or a turbine engine for a greater number of flight conditions, angles of attack, and from ground ingested FOD during vertical takeoff and landing.

17 Claims, 16 Drawing Sheets

(56) References Cited

U.S. PATENT DOCUMENTS

| | | | |
|---|---|---|---|
| 2014/0182306 A1* | 7/2014 | Castagnera | F28D 7/00 |
| | | | 60/784 |
| 2016/0076400 A1* | 3/2016 | Weir | G10K 11/175 |
| | | | 415/119 |
| 2017/0191414 A1* | 7/2017 | Martinez | B64D 33/02 |
| 2019/0092456 A1 | 3/2019 | Sawyers | |
| 2019/0304428 A1* | 10/2019 | Sandiford | G10K 11/172 |

* cited by examiner

LAMINAR INDUCING APPARATUS

BACKGROUND

Field of invention for the Laminar Inducing Apparatus (LIA) is within the CPC classification: B64C2230/04 (by actively generating fluid flow).

The intake for the Auxiliary Power Unit (APU) is typically located in a commercial airplane's tail cone. The APU is a turbine engine, comprising of a compressor, a combustion chamber, and a turbine. During flight, a turbulent boundary layer envelops an airplane, and thicker toward the tail of the airplane. The turbulent boundary layer typically grows thicker moving toward the tail of the aircraft. On the nose or engine inlet of a commercial airplane, airflow is laminar, smooth and predictable.

Laminar airflow is smooth and is predictable. One method for mitigating the turbulent boundary layer is to extend the APU air inlet beyond the turbulent boundary layer into the laminar airflow.

The APU inlet is typically mounted in the tail or empennage. On the Boeing 737 MAX, a scoop faces the airflow and is tall enough, to reach beyond the boundary layer of turbulent airflow.

The efficiency of the engines mounted on the wings area are vulnerable to turbulent airflow. This is one reason the engines on the Boeing 777X are mounted on the wing far from the fuselage. Air is "cleaner," freer from turbulence.

Small improvements in commercial airplanes efficiency have significant impact. Range is extended, fuel is saved, and emissions are reduced. Emissions include carbon dioxide ($CO_2$) and nitrogen oxide (NOx). Improving the Boeing 777 efficiency by 1% can provide an annual savings of 1 million pounds of fuel and an annual reduction of more than 3 million pounds (1,360,000 kilograms) of $CO_2$. Tremendous savings are identified when multiplying those benefits across a fleet of 1,000 airplanes for a duration of thirty years. Saving even one-quarter of 1% significantly conserves fuel and reduces emissions impacting health and mitigates climate change.

Laminar Inducing Apparatus (LIA) reduces turbulence to a turbo engine or propulsion fan. The LIA cleans the turbulent air regardless of flying conditions or angle of attack. In addition, the LIA may provide for the reduction of the turbulent boundary layer enveloping the external skin of the aircraft. There is also opportunity for manipulating the turbulent boundary surface as a flight control surface.

SUMMARY

A Laminar Inducing Apparatus (LIA) in tandem with a turbine engine, comprising, an external-air inlet connected to an aircraft skin opening, a plenum is connected to the external-air inlet, stacked straws connected to the plenum, and a turbine engine connected in tandem to the stacked straws outerwall.

Alternatively, a LIA may replace the in tandem turbine engine with a tandem propulsion fan, comprising, an external-air inlet connected to an aircraft skin opening, a plenum connected to the external-air inlet, a stacked straws connected to the plenum, a propulsion fan connected in tandem to the stacked straws.

Alternatively, a LIA with an external-air inlet fan ensures positive pressure to the plenum, and also creates an opportunity for manipulating the turbulent boundary surface as a flight control surface comprising, an external-air inlet connected to an aircraft skin opening, a plenum connected to the external-air inlet, a stacked straws connected to the plenum; and an external-air inlet fan within the external-air inlet.

BRIEF DESCRIPTION OF THE FIGURES

The apparatus may be better understood by referring to the following figures. The components in the figures are not necessarily to scale, emphasis instead being placed upon illustrating principles of the apparatus. In the figures, reference numerals designate corresponding parts throughout the different views.

DETAILED DESCRIPTION

A Laminar Inducing Apparatus (LIA) inducing laminar airflow to a turbine engine or propulsion fan. The LIA produces turbulent-free airflow with a light aerospace structure that can replace single purpose structure in the wing or empennage. Laminar airflow to the propulsion fan or the turbine engine is ensured in a greater number of flight conditions and angles of attack. Active control of flight can be enhanced by the manipulating the turbulent boundary surface as a flight control surface. LIA simply reduces the risk of FOD or bird strike damage. In addition to the engineered, laminar benefits, LIA provides greater safety from ground ingested FOD and more silent vertical take-off and landing.

Disclosed is a section view of a Laminar Inducing Apparatus (LIA) implementation in accordance with the present disclosure. The LIA induces laminar airflow in a turbine engine. A turbine engine comprising of a compressor, a combustion chamber, and a turbine. An alternative apparatus, the LIA induces laminar airflow in a propulsion fan. The LIA can simultaneously reduce the turbulent boundary layer enveloping an aircraft. Reducing the turbulent boundary layer can improve aerodynamics of the airplane. The external-air inlet fans may also manipulate the turbulent boundary surface as a flight control surface.

Figure 1:
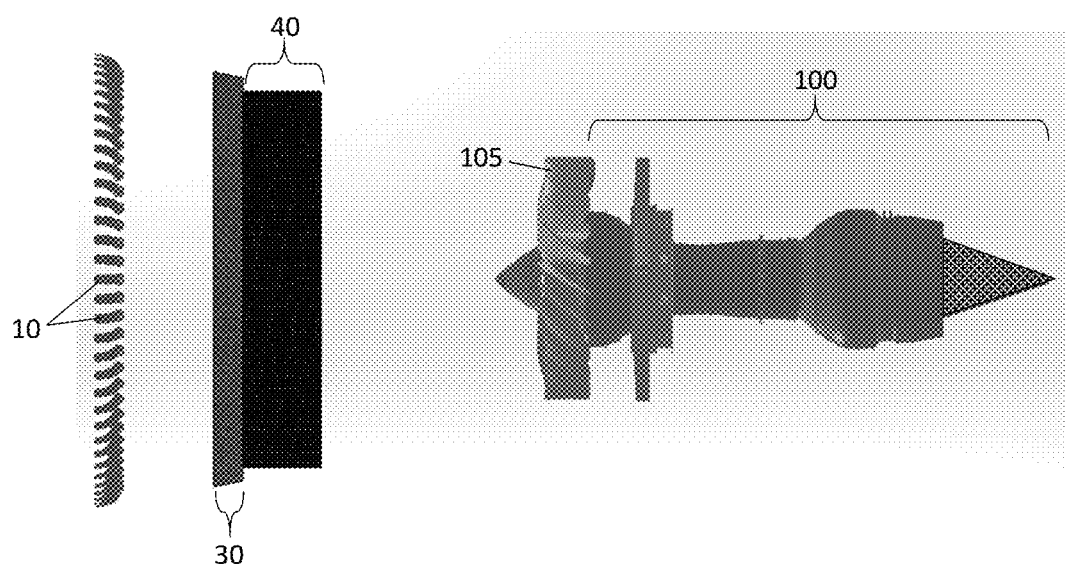
FIG. 1 is a side view of an example of a Laminar Inducing Apparatus (LIA) implementation in accordance with the present disclosure.
Figure 2:
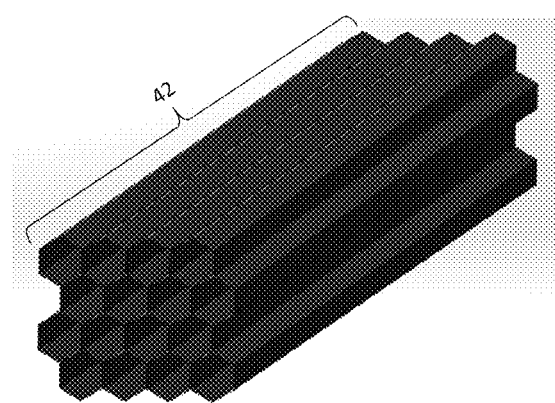
FIG. 2 and FIG. 3 are isometrics of an example of stacked straws in accordance with the present disclosure.
Figure 3:
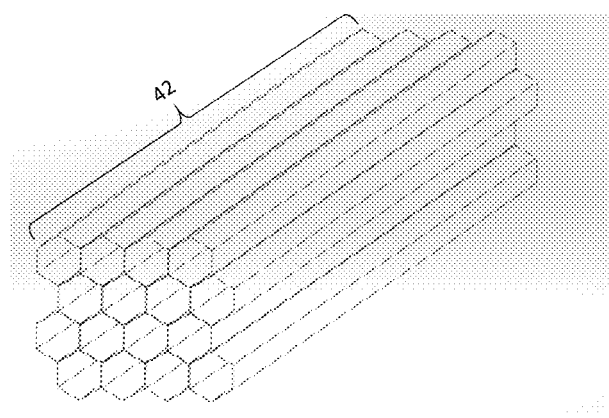

In FIG. 1 a LIA induces laminar airflow in a turbine engine compressor. Air enters into the aircraft through an external-air inlet 10. Generally, the cross-sectional area of the airflow will increase as it moves thought the external-air inlet and through a plenum FIG. 5 400. A fibrous filter FIG. 1 30 provides randomly arranged fibers. The fibrous filter reduces turbulence in the airflow. The heart of the Laminar Inducing Apparatus (LIA) is a plurality of straws, that are stacked and have the same length. Looking at FIG. 2 and FIG. 3 sixteen stacked straws are substantially hexagonal. Stacking the straws begins the process of building a substantially hexagonal pattern, and is enhanced with a hexagonal mold.

The Stacked Straws 40 should have a diameter of less than 0.76 centimeter (0.3 inches). The stacked straws 40 provides for a structure without adding substantial weight to an aircraft. Thin walled straws are made of Carbon Fiber Reinforced Plastic (CRFP). Each straw is formed on an aluminum mold. Each aluminum mold is substantially hexagonal. The cured stacked straws will be substantially hexagonal.

Panel hexagonal cells in a nacelle are different than the stacked straws. Each stacked straw is not a simple hexagonal cell. Stacked straws are open on both ends and are similar to straws used for drinking soda or straws used to stir coffee. The cross-section diameter of a straw is at least 5 times less than the length of the straw. Secondly, LIA is a Laminar Inducing Apparatus (LIA) with an emphasis on Inducing and has fluid communication between the straw and a turbo engine or a propulsion fan. The straw could be shortened further if a fibrous filter is added and the configuration would still induce laminar airflow.

Within the composite industry, frozen CFRP is known as prepeg. After the aluminum mold is wrapped with CFRP, the aluminum mold and straw are frozen. The aluminum mold cross section is substantially hexagonal. The frozen straw and mold are stacked into a substantially round or toroidal arrangement. On both ends of the aluminum mold extends beyond the straw about 10 mm (0.4 inches). The extension is on the stacked straws front face and on the stacked straws back face and provides for an evenly distributed vacuum across the front face and back face while providing excellent support to the vacuum bag.

A vacuum bag envelops the arrangement. After the stacked straws and the stacked straws outerwall thaw, a vacuum is applied to the bag. Heat accelerates the CFRP cure. After the part is cured, the aluminum molds are removed from each straw.

The result is a light and strong structure that provides for turbulent-free airflow. Fitting the light structure to an aircraft will provide structure without adding substantial weight. With the stacked straws in a wing, the wing spar structure can be reduced. With stacked straws 40 in the empennage: the thickness of the frames, stringers and skin can be reduced.

Figure 8:
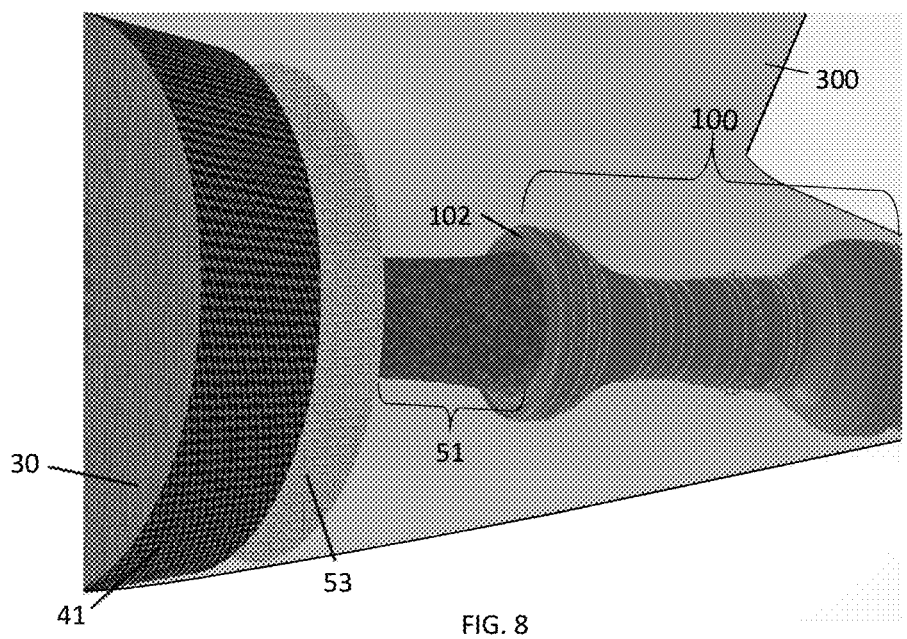
FIG. 8 is an isometric-view of an example of a LIA with a view of a screen and nozzle innerwall in accordance with the present disclosure.

Airflow exiting the stacked straws is substantially turbulent free and flows to the compressor face FIG. 8 102. In FIG. 1 the propulsion fan 105 adds positive pressure to the compressor face in the turbo engine 100. The airflow should be laminar at the compressor face. Turbulent flow is a detriment to turbo engine efficiency.

Figure 4:
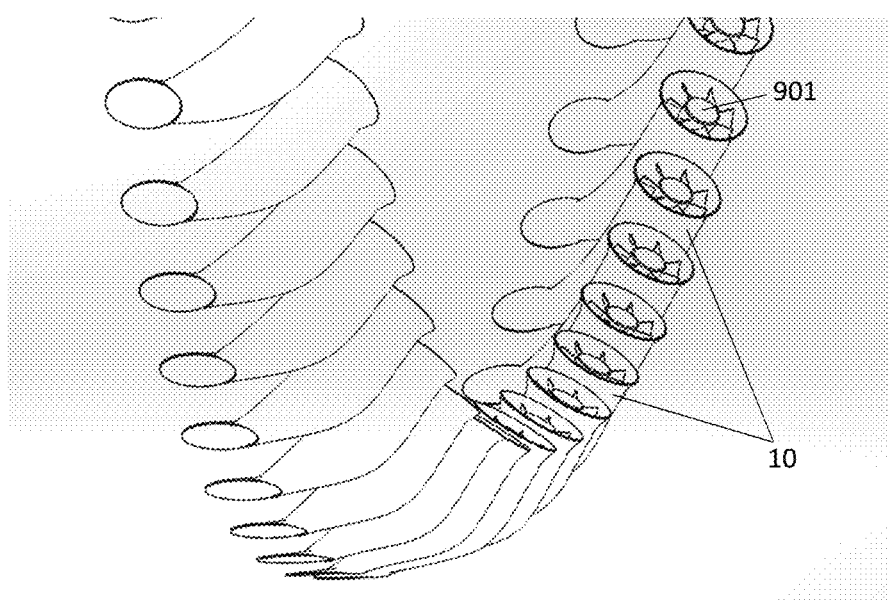
FIG. 4 is an isometric of an example of external-air inlets in accordance with the present disclosure.

In FIG. 4, external-air inlets 10 are connected to the to the external skin of the aircraft providing airflow external to the aircraft to flow into the aircraft internal. External-air inlet fans 901 are within the external-air inlet. Attaching to an end of the external-air inlet is functional similar. The external-air inlet cross-section generally increases from the vehicle's exterior to the external-air inlet's exhaust. The cross-section should increase from the aircraft exterior to the stacked straws, because slow airflow through stacked straws reduces airflow turbulence. Before exiting the stacked straws, the airflow should be laminar making the following stage of compression much more efficient.

Extended Twin Operations (ETOPS) is a requirement for maintaining safety should one engine fail. In a hybrid configuration, a battery could be construed as one engine and a turbo engine with a generator a second engine. FIG. 4 through FIG. 10 the LIA apparatus enables an ETOPS hybrid configuration. Factoring all the pros and cons may prove advantages and accelerate, aircraft electrification. Reducing two turbo engines to one turbo engine reduces the number of moving parts and improve the efficiency of the engine by having a single turbo engine.

Figure 5:
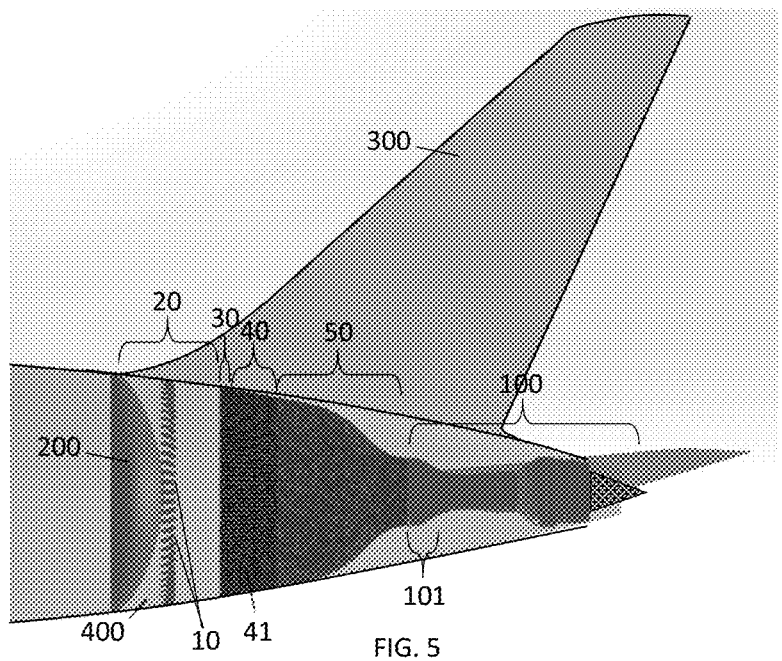
FIG. 5 is a side-view of an example of a LIA within the context of an aircraft profile in accordance with the present disclosure.

Looking at FIG. 5 a plenum 20 is an air-filled space after the airflow from the external-air inlet. In FIG. 5 the plenum's structure is provided by a pressure vessel bulkhead 200, a fuselage skin 400 and the fibrous filter 30. The plenum is pressurized and provides more consistent, positive pressure. The plenum also equalizes pressure for even distribution. The plenum also works as an acoustic silencing device for the turbo engine 100 compressor 101 or propulsion fan 105. The fibrous filter 30 provides an additional layer for equalizing the pressure before entering the stacked straws 40. Turbulent airflow enters the stacked straws, and non-turbulent airflow exits. Acoustic attenuation is combination of stacked straws and the plenum's baffling effect. Extending the exhaust duct would help reduce propulsion's audio or acoustic signature.

Continuing with FIG. 5, the stacked straws 40 are wrapped with the stacked straw outerwall 41. The stacked straw outerwall should be made of a similar material that the stacked straws 40 are made of CFRP is a good choice due to its light weight and structural attributes. Not all straws need to allow airflow. Some straws can terminate into the stacked straws outerwall 41 and be part of the stacked straws outerwall.

After the stacked straws, the airflow flows through a nozzle outerwall 50. In FIG. 8, the nozzle innerwall 51 can be observed. Between the nozzle innerwall then nozzle outerwall, the airflow moves toward the turbo engine 100. In FIG. 5, a compressor 101 is where the engine compresses air before the combustor where fuel is added. In contrast to the turbulent airflow, laminar airflow in the compressor makes the engine more efficient.

In FIG. 5, an aircraft vertical tail 300 is shown in context with the stacked straws outerwall. The aircraft vertical tail withstands large loads during flight. The stacked straws and the stacked straws outerwall will give much needed support to the vertical tail and will allow reducing the supporting structure for the aircraft vertical tail. With stacked straws, an overall weight savings is possible.

Figure 6:
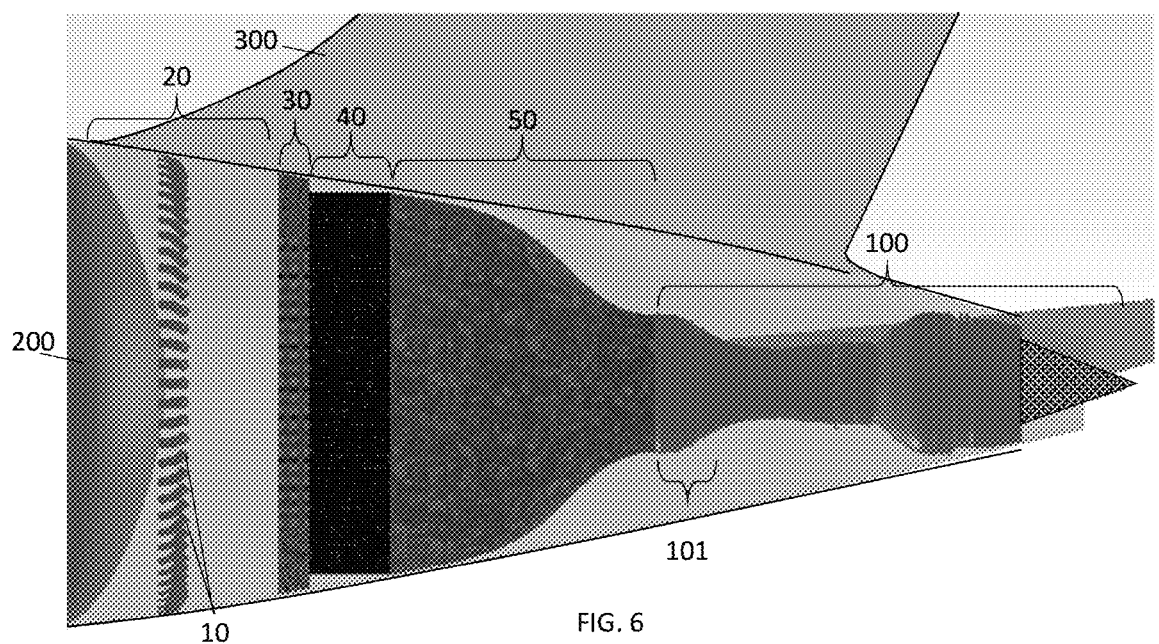
FIG. 6 is a side-view of a LIA example with an unobstructed view of stacked straws in accordance with the present disclosure.
Figure 7:
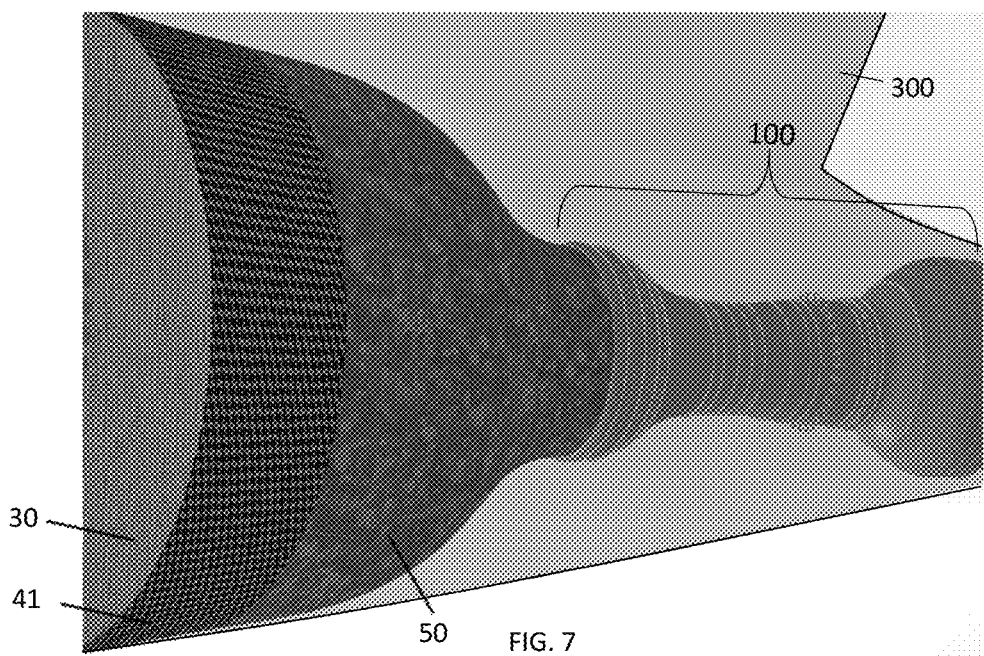
FIG. 7 is an isometric-view of an example of a LIA with a view of fibrous filter and nozzle outerwall in accordance with the present disclosure.

In the side view FIG. 6, the stacked straw outerwall has been removed, exposing the side of the fibrous filter 30 and the side of the stacked straws 40. In the isometric view FIG. 7, the face of the fibrous filter 30 is visible. The stacked straw outerwall 41 now covers the side of the fibrous filter. The nozzle outerwall 50 is visible.

Figure 10:
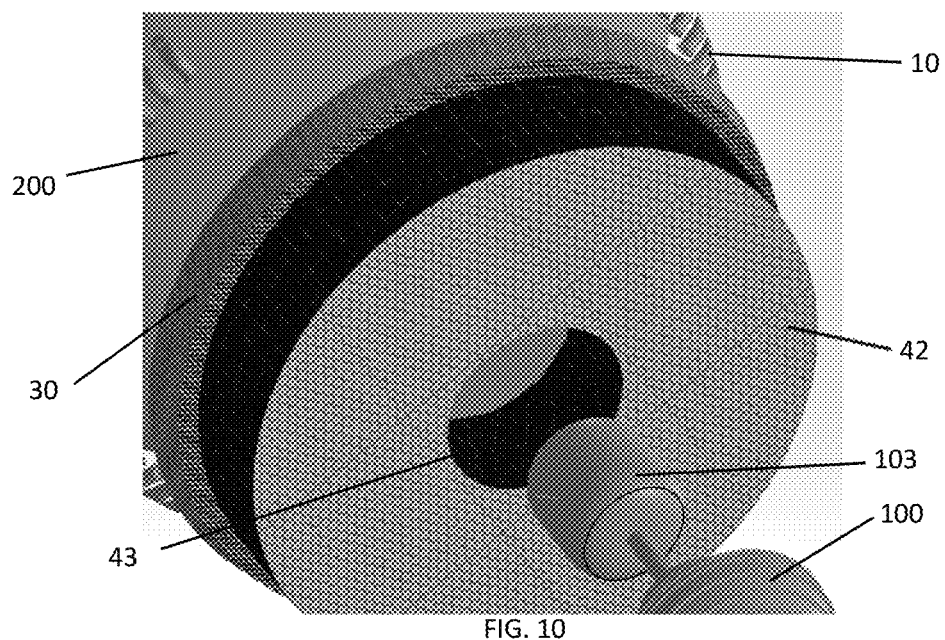
FIG. 10 is an isometric-view of an example of a LIA, stacked straws arranged as a toroid in accordance with the present disclosure.

In the isometric view, FIG. 8, the nozzle outerwall is removed, and the nozzle innerwall 51 is visible. The nozzle innerwall is similar to a spinner 109, shown in FIG. 11, but the nozzle innerwall does not spin in this turbo engine configuration. In FIG. 10 the stacked straws are toroidal and the nozzle innerwall connects directly to the stack straws innerwall 43.

Looking back at FIG. 8, a screen 53 is visible. The screen is stretched between the nozzle innerwall and the nozzle outerwall. A screen can also be stretched by the nozzle outerwall without the nozzle outerwall. The screen helps equalize airflow coming from the stacked straws. In contrast to the fibrous filter, the screen is thin. In FIG. 8, the nozzle innerwall is the configuration, and the screen is within the nozzle outerwall, not shown. Just as engines are fastened together by sections, the nozzle outerwall can be fastened together as sections with the screen sandwiched between the two sections.

Figure 9:
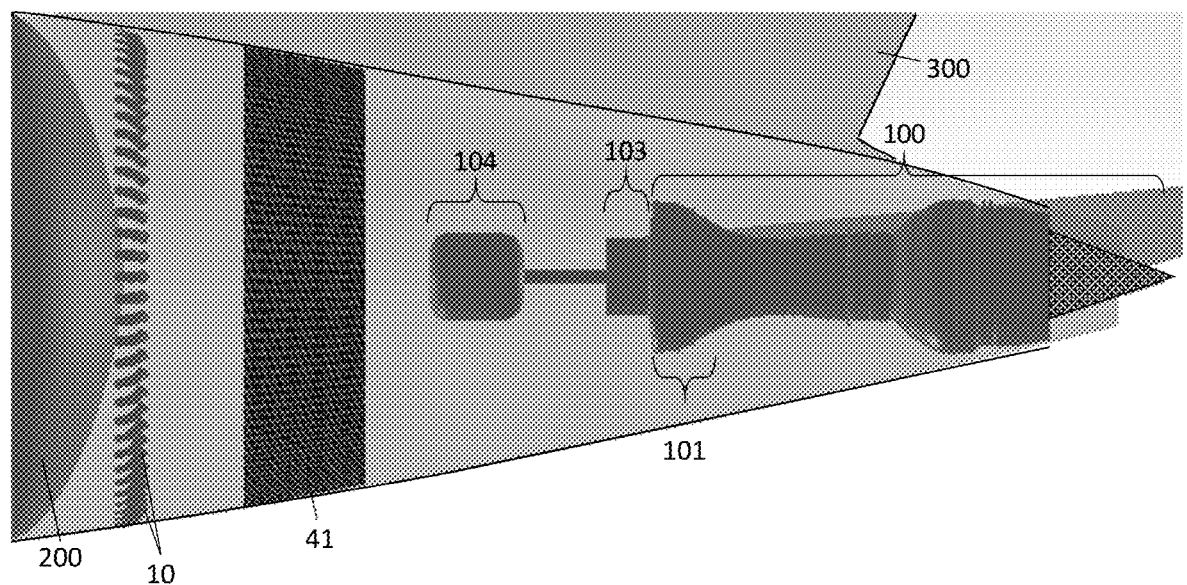
FIG. 9 is a side-view of a LIA, turbine engine and nozzle innerwall removed showing an electric generator.

Turning to FIG. 9, the nozzle innerwall is removed exposing a gear reduction 103 and an electric generator 104. In combination with the engine, the configuration is sometimes called a turboelectric. Exhaust vents horizontal thrust. For vertical takeoff and landing aircraft, the Lockheed F-35B transforms the horizontal thrust into vertical thrust using a 3-bearing swivel duct nozzle.

Looking at FIG. 10, an isometric view, the back of the stacked straws 42 is visible, with a substantially hexagonal pattern. The hexagonal pattern is not drawn to scale.

Figure 11:
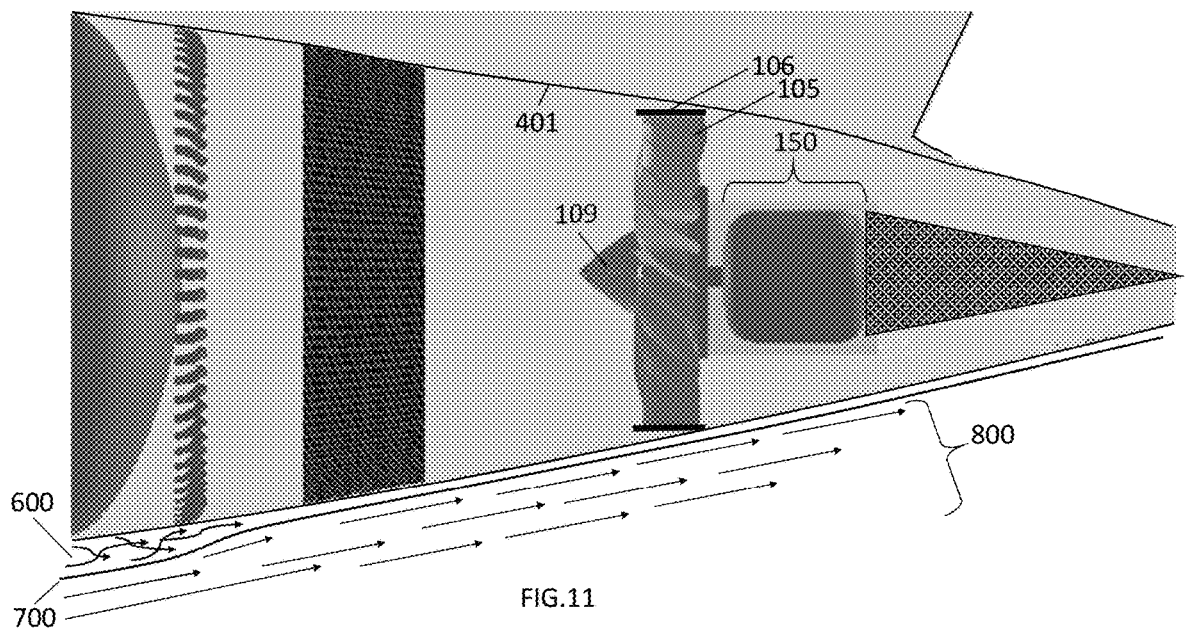
FIG. 11 is a side view of an example of a LIA with a propulsion fan powered by an electric motor in accordance with the present disclosure.

FIG. 11 is a side view of an example of a LIA with an electric fan in accordance with the present disclosure. A turbulent boundary layer 600 moves along the skin of an aircraft and will move slower and has more drag than the laminar airflow 800. A turbulent boundary surface 700 is between the turbulent boundary layer 600 and the laminar airflow 800. The external-air inlet fans 901 in the external-air inlets 10 can manipulate the turbulent boundary surface 700 as a flight control surface while simultaneously maintaining positive pressure to the plenum. Manipulating the turbulent boundary surface 700 controls the laminar airflow 800 and helps control the flight of the aircraft.

The LIA is advantageous with a turbo engine or an electric fan. In FIG. 11, an electric motor 150 is connected to the fan 105. The fan casing 106 is connected to a nozzle outerwall. The nozzle outerwall could be integrated with a fuselage 401. Two stacked straws could be installed, with a plenum between the two stacked straws. Two stacked straws may provide necessary structure for vertical tail loading.

In aviation, foreign object debris (FOD) is any article or substance, alien to an aircraft or system, which could potentially cause damage. External FOD hazards include bird strikes, hail, ice, sand, ash or objects left on a runway. LIA is inherently immune to bird strike. Not only does this attribute increases safety, the weight of the fan blades can be reduced. Normally, fan blades are designed to withstand bird strike, but with LIA, the requirement for the propulsion fan to withstand a bird strike on the fan could be omited since it would be practically impossible for a bird to strike the fan or engine, when operating in tandem with a LIA.

Figure 12:
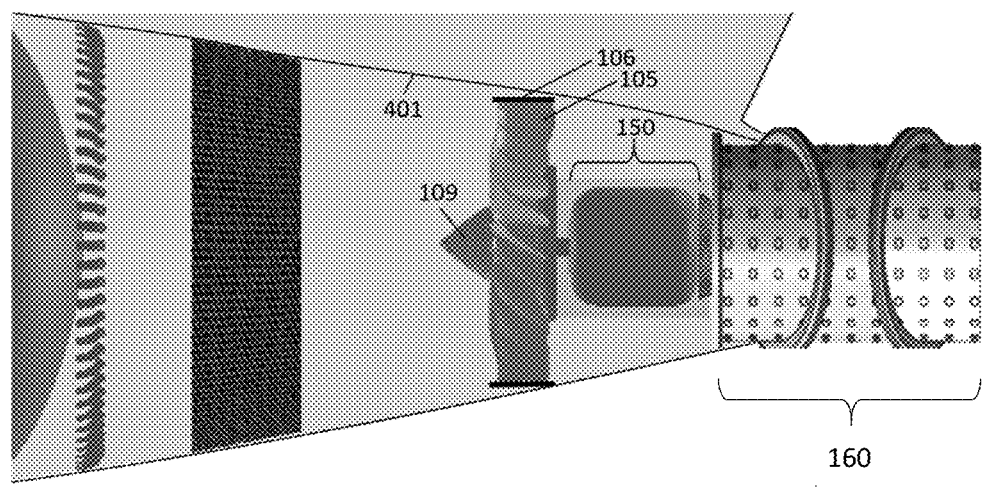
FIG. 12 is a side view of an example of a LIA with a 3 bearing swivel duct nozzle in cruise mode.
Figure 13:
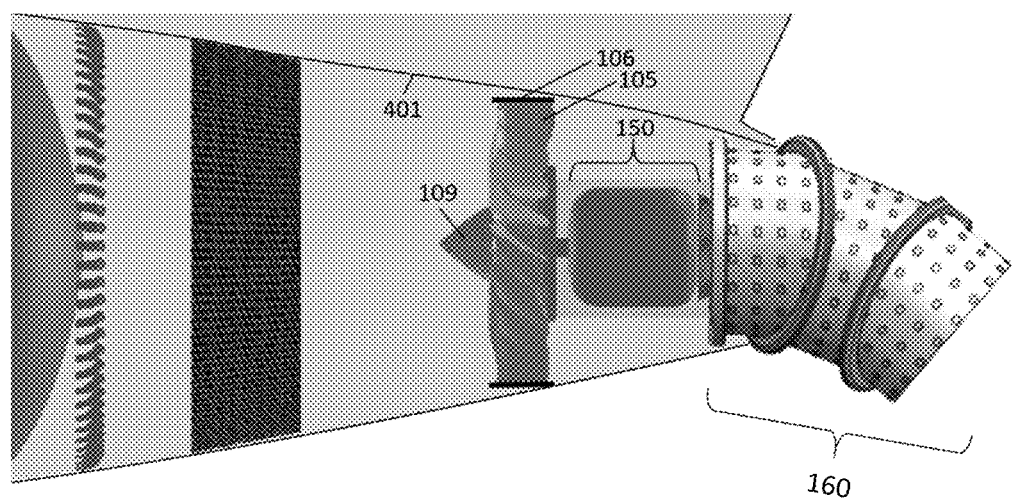
FIG. 13 is a side view of an example of a LIA with a 3 bearing swivel duct nozzle in short take-off and landing (STOL) mode.
Figure 14:
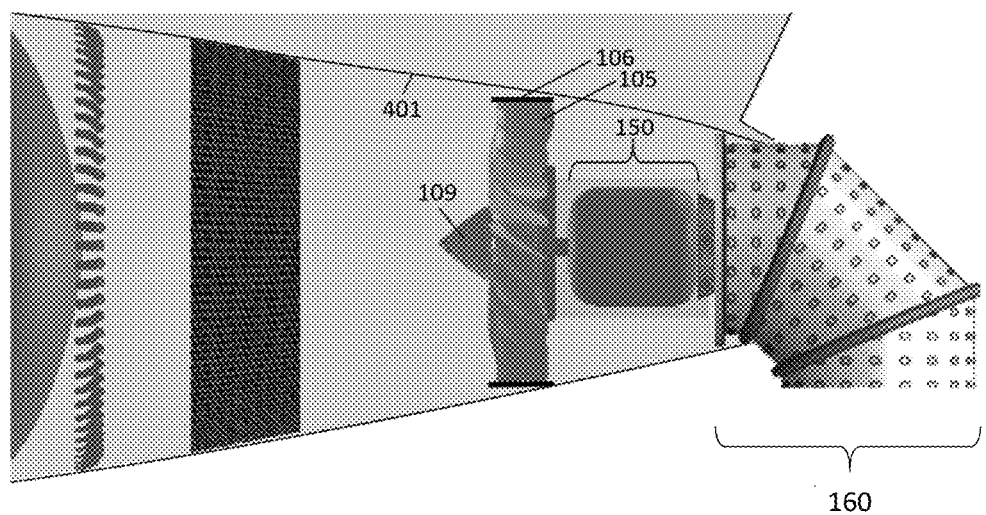
FIG. 14 is a side view of an example of a LIA with a 3 bearing swivel duct nozzle in vertical take-off and landing (VTOL) mode

FIG. 12, FIG. 13 and FIG. 14 represent a sideview of a 3 bearing swivel duct nozzle 160. The figures represent three modes. FIG. 12 shows the 3 bearing swivel duct nozzle in cruise mode. FIG. 13 shows 3 bearing swivel duct nozzle in short take-off and landing (STOL) mode. FIG. 14 shows 3 bearing swivel duct nozzle in vertical take-off and landing (VTOL) mode. The 3 bearing swivel duct nozzle is implemented on the Lockheed F-35B. With LIA, the 3 bearing swivel duct nozzle can further reduce propulsion noise. Vertical takeoffs and landings are riskier because of FOD threats. LIA's plenum, however, reduces FOD threats, and an electric fan configuration also reduces FOD threats. The combination could significantly increase safety.

Figure 15:
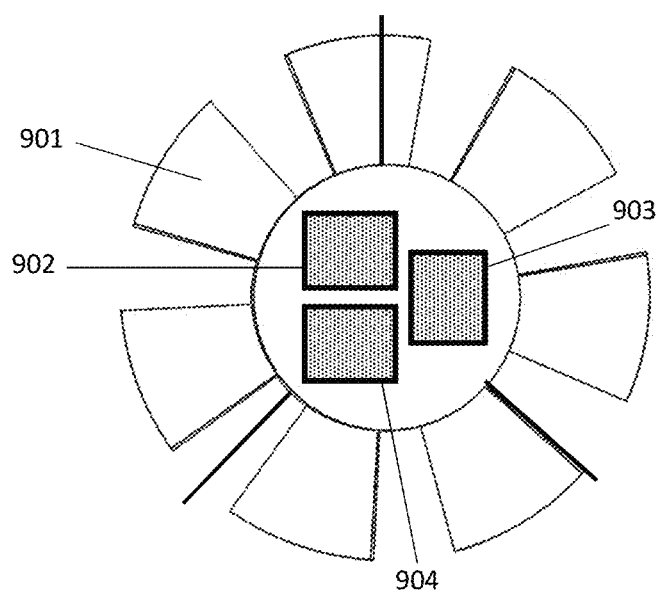
FIG. 15, is a back view of an external-air inlet fan and multiple controllers in accordance with the present disclosure.

Looking at FIG. 15, the external-air inlet fan 901 integrates multiple controllers. The variable-speed controller is commercially available, off the shelf, at ElectroCraft, located in Stratham, N.H. 03885-2578, USA has a commercially available ElectroCraft PRO Series Drives, part number PRO-A08V48B-CAN. A reverse-speed controller 903 can be created from the PRO-A08V48B-CAN or integrated with the variable-speed controller 902. Likewise, with a variable-pitch controller 904.

Figure 16:
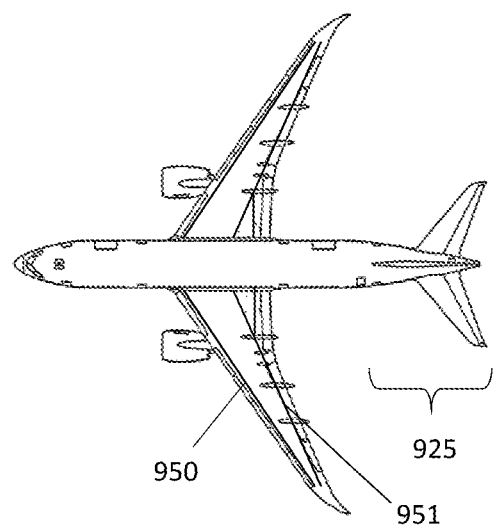
FIG. 16 is a top view of an airplane showing the spars in the wing in accordance with the present disclosure.

FIG. 16 is a top view of an airplane showing a front spar 950 and an aft spar 951 in the wing in accordance with the present disclosure. A wing may have only one spar. On the Boeing 787 each wing has two spars. The front spar 950 and aft spar 951 comprise a torsion box. The top of the wing represents the top of the box and the bottom of the wing represents the bottom of the box. Each of the four elements are made of CFRP. Each spar is thick and taller toward the root of the wing, which is where the wing connects to the fuselage. Again, sections of the front spar or aft spar could be replaced with the stacked straws and support inflight loads. Instantiating LIAs on the wings and empennage would be an excellent Vertical Take Off and Landing (VTOL) configuration. The empennage 925 is the tail of the airplane.

The description of the different illustrative examples has been presented for purposes of illustration and description and is not intended to be exhaustive or limited to the examples in the form disclosed. Many modifications and variations will be apparent to those of ordinary skill in the art. The examples, explain practical application, and enable others of ordinary skill in the art to understand the disclosure with various modifications.

What is claimed is:

1. An acoustic lia in tandem with a turbine engine, comprising:
   an external-air inlet connected to an aircraft skin opening;
      a plenum positioned in proximity to, and in fluid communication with, the external-air inlet;
      a stacked straws positioned in proximity to, and in fluid communication with, the plenum;
      a turbine engine positioned in proximity to, and in fluid communication with, the stacked straws; and
   a nozzle outerwall is between the stacked straws and the turbo engine.

2. The lia as recited in claim 1, wherein a fibrous filter is between the plenum and the stacked straws.

3. The lia as recited in claim 1, wherein the stacked straws are carbon fiber reinforced plastic.

4. The lia as recited in claim 1, wherein a screen is inside the nozzle outerwall.

5. The lia as recited in claim 1, wherein the stacked straws are substantially toroidal.

6. The lia as recited in claim 1, wherein a 3-bearing swivel duct nozzle is connected to the turbine engine.

7. An acoustic lia in tandem with a propulsion fan, comprising:
   an external-air inlet connected to an aircraft skin opening;

a plenum positioned in proximity to, and in fluid communication with, the external-air inlet;
a stacked straws positioned in proximity to, and in fluid communication with, the plenum;
a propulsion fan positioned in proximity to, and in fluid communication with, the stacked straws; and
a nozzle outerwall is between the stacked straws and the propulsion fan.

8. The lia as recited in claim 7, wherein a fibrous filter is between the plenum and the stacked straws.

9. The lia as recited in claim 7, wherein the stacked straws are carbon fiber reinforced plastic.

10. The lia as recited in claim 7, wherein a screen is inside the nozzle outerwall.

11. The lia as recited in claim 7, wherein the stacked straws are substantially toroidal.

12. The lia as recited in claim 7, wherein a 3-bearing swivel duct nozzle is positioned in proximity to, and in fluid communication with, the propulsion fan.

13. An acoustic lia with an external-air inlet fan, comprising:
an external-air inlet connected to an aircraft skin opening;
a plenum positioned in proximity to, and in fluid communication with, the external-air inlet;
a stacked straws positioned in proximity to, and in fluid communication with, the plenum; and
an external-air inlet fan disposed with, and in fluid communication with, the external-air inlet.

14. The lia as recited in claim 13, wherein the external-air inlet fan has a variable-speed controller.

15. The lia as recited in claim 13, wherein the external-air inlet fan has a reverse-speed controller.

16. The lia as recited in claim 13, wherein a propulsion fan is in fluid communication with connected to the stacked straws.

17. The lia as recited in claim 16, wherein a 3-bearing swivel duct nozzle is positioned in proximity to, and in fluid communication with, the propulsion fan.

* * * * *